No. 711,675. Patented Oct. 21, 1902.
E. H. PHIPPS.
VEHICLE CONSTRUCTION.
(Application filed Feb. 8, 1902.)
(No Model.)
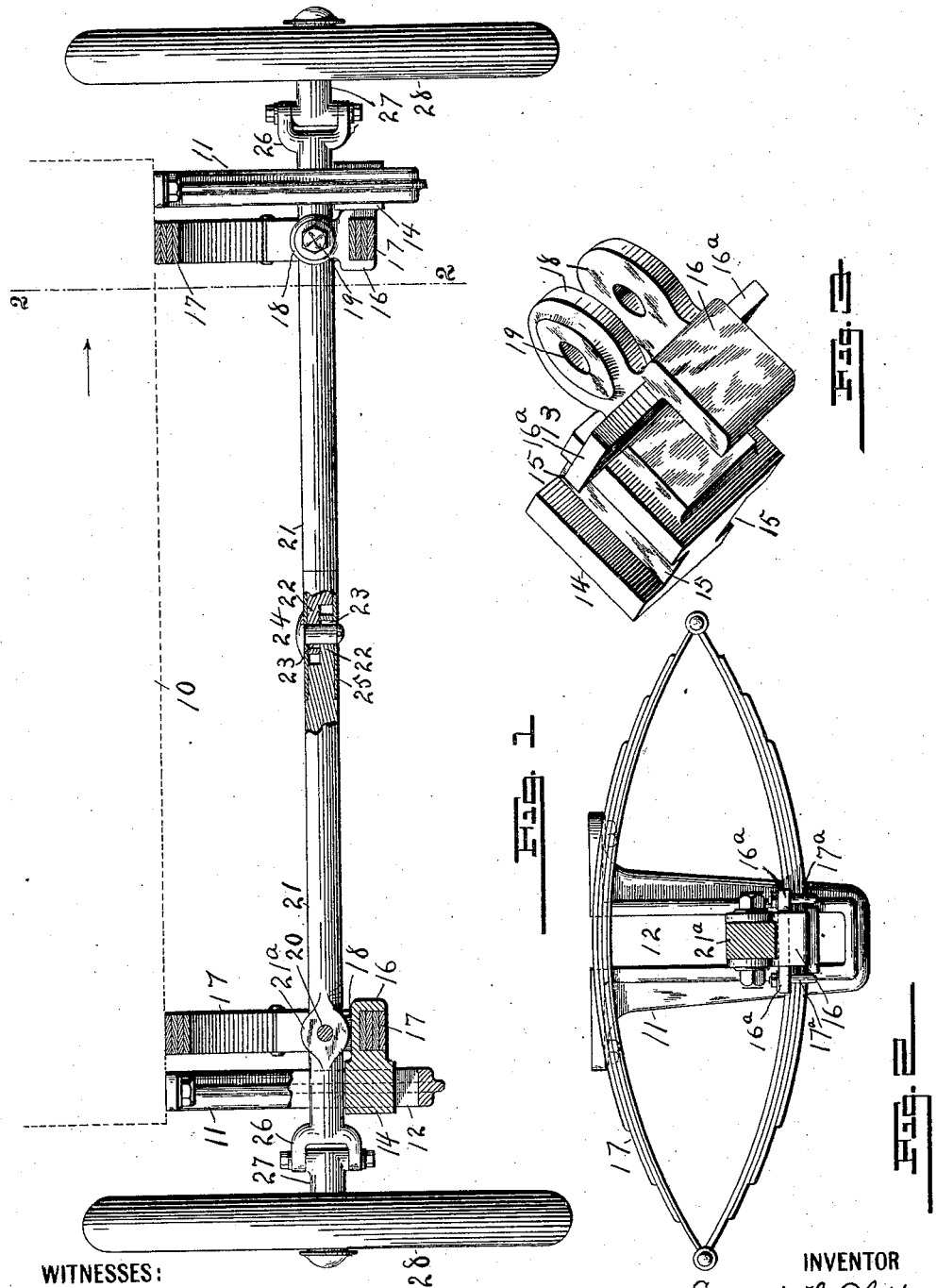
WITNESSES:
INVENTOR
Edward H. Phipps.
BY
W. B. Hutchinson.
ATTORNEY
THE NORRIS PETERS CO., PHOTO-LITHO., WASHINGTON, D. C.

UNITED STATES PATENT OFFICE.

EDWARD H. PHIPPS, OF NEW YORK, N. Y., ASSIGNOR TO PHIPPS ROAD CAR COMPANY, A CORPORATION OF NEW JERSEY.

VEHICLE CONSTRUCTION.

SPECIFICATION forming part of Letters Patent No. 711,675, dated October 21, 1902.

Application filed February 8, 1902. Serial No. 93,264. (No model.)

*To all whom it may concern:*

Be it known that I, EDWARD H. PHIPPS, of the city, county, and State of New York, have invented certain new and useful Improvements in Vehicle Construction, of which the following is a full, clear, and exact description.

My invention relates to improvements in certain details of vehicle construction, and more particularly to improvements in the construction of motor-vehicles.

The object of my invention is to produce an improved and simple connection between the vehicle-body and the wheels, such improvements lying partly in the axle and partly in the connection between the axle and the vehicle-body, by which a very stable platform is secured, to the end that the engine, boiler, and accessory parts may be carried safely and efficiently, and also to provide the necessary flexibility at the four corners of the vehicle, so that in case any wheel strikes a rock or obstruction the wheel and adjacent parts can move up vertically without imparting any considerable shock to the vehicle-body or parts carried thereby.

Other objects of my invention are to make this improved construction simple, mechanical, and reliable, to provide suitable means for the slight necessary elongation of the axle in case one wheel is moved up suddenly, and to hang the axle and parts so that the strain on the tires in steering and in case of shock will be reduced.

To these ends my invention consists of certain features of construction and combinations of parts, which will be hereinafter fully described and claimed.

Reference is to be had to the accompanying drawings, forming part of this specification, in which similar figures of reference refer to similar parts throughout the several views.

Figure 1 is a cross-sectional elevation showing one axle of a vehicle and the connection between the axle and the vehicle-body. Fig. 2 is a detail cross-section on the line 2 2 of Fig. 1, and Fig. 3 is an enlarged detail perspective view of the slide-block and clip used in connecting the axle and vehicle-springs.

The body 10 of the vehicle, which is merely indicated by dotted lines, can obviously be of any usual construction, and on opposite sides of the body and adjacent to the axles of the running-gear are depending brackets 11, which are firmly secured to the body and which are provided with vertical ways 12, in which the slide-block and clip 13 can move, as described presently. I have shown a desirable form of this bracket 11; but it will be noticed from the description to follow that the essential thing is to provide the way 12, and the form of bracket is not material.

The slide-block or double clip 13 (shown in Fig. 3) comprises, in part, a slide-block 14, which is grooved on opposite sides, as shown at 15, to the end that it can be placed in the way 12 and move vertically without danger of displacement, the side walls of the grooves overlapping the sides of the way. Projecting from the inner side of the slide-block 14 is a clip 16 of a generally inverted-U shape, which is adapted to fit snugly over the lower member of the elliptical spring 17. I have shown an ordinary commercial elliptical spring 17; but the invention is not limited to this particular style of spring, as others of a similar nature may be substituted—as, for instance, a spiral spring might be arranged in the way 12 between the axle and the vehicle-body. The form of spring shown is, however, preferable. To provide for better securing the slide-block to the springs, the back of the clip 16 is provided with lugs $16^a$, which are adapted to lie flat on the lower member of the spring 17 and engage the ordinary U-bolts $17^a$.

On the upper side of the clip 16 are parallel ears 18, which are pierced, as shown at 19, so as to receive the horizontal pivot or bolt 20, which extends through the ears and through the squared portion $21^a$ of the axle 21, thus making a firm yet flexible connection between the axle and spring.

It will be seen that if a wheel is knocked up suddenly, as by passing over an obstruction, there will be a slight movement at the pivot 20, and to compensate for this movement and to make the shock as light as possibe I have provided means for elongating the axle, and to this end the axle 21 is made in two parts, each having at its inner end a reduced member 22, which overlaps a corresponding part on the opposed axle-section, these overlapping parts being slotted, as shown at 23, to receive the bolt 24, which passes through them and also through a sleeve 25, which fits closely on the axle, being preferably let into the same, as shown in Fig. 1, so that the axle is to all appearances a solid axle of a single piece. It will be seen then that when either wheel is moved up suddenly there will be a slight movement at the pivot 20 and that the axle will elongate itself sufficiently to provide for the movement and shock, so that the wheel and connected parts on the other side of the vehicle will be practically undisturbed. This provision for hanging the body on the axle for a pivotal connection with the axle and for the slight elongation of the axle makes the parts flexible and yet strong, so that any lateral or vertical movements of the wheels are easily made, the shock is absorbed, at least in part, and the strain on the vehicle parts is removed.

Any usual connection can be made between the outer ends of the axle and the vehicle-wheels. As illustrated, the axle terminates at the ends in yokes 26, which are pivotally connected with the short axle-sections 27, which connect with the wheels 28 in the customary manner.

Having thus described my invention, what I claim as new, and desire to secure by Letters Patent, is—

1. As an improved article of manufacture, a vehicle-axle comprising similar end sections having reduced meeting portions which slide one on the other, a sleeve inclosing the said overlapping sections, and a bolt connecting the sleeve and the overlapping axle parts.

2. The herein-described running-gear comprising a longitudinally-extensible axle having means for connection with vehicle-wheels, a hanger or bracket on the vehicle-body, a slide-block movable in the hanger and pivoted to the axle in such a way that the axle may rock in relation to the hanger, and a spring connection between the slide-block and the vehicle-body.

3. The herein-described running-gear comprising an extensible axle, a spring arranged to support a vehicle-body, a slide-block pivoted to the axle and connected to the spring, and a guide to provide for the vertical movement of the slide-block.

4. The herein-described running-gear comprising an extensible axle, slide-blocks pivoted to the axle near opposite ends thereof, springs connected to the slide-blocks, and brackets adapted to be secured to a vehicle-body, said brackets having ways to receive the slide-blocks.

5. The combination with the vehicle-body and the axle, of the springs arranged beneath the vehicle-body, the brackets having vertical ways therein, and slide-blocks movable in the said ways, the slide-blocks being provided with rigid clips to fit on the lower members of the springs and having also a pivotal connection with the axle.

6. The combination with the vehicle-body, the axle, and the springs arranged beneath the vehicle-body, of the brackets secured to the vehicle-body and provided with vertical ways, the slide-blocks movable in the said brackets, the clips rigid on the slide-blocks and arranged to engage the lower members of the springs, and ears on the clips, said ears being pivoted to the axle.

7. An apparatus of the kind described, comprising a longitudinally-extensible axle, brackets having means for attachment to a vehicle-body and provided with vertical ways, slide-blocks movable in the said ways, clips formed on the slide-blocks to engage the lower members of the aforesaid springs, and means for pivoting the clips to the axle.

In testimony whereof I have signed my name to this specification in the presence of two subscribing witnesses.

EDWARD H. PHIPPS.

In presence of—
WARREN B. HUTCHINSON,
THERON DAVIS.